(12) United States Patent
Harlow (10) Patent No.: US 10,080,638 B1
(45) Date of Patent: Sep. 25, 2018

(54) PROTECTIVE WRAP

(71) Applicant: Thomas Harlow, Stuarts Draft, VA (US)

(72) Inventor: Thomas Harlow, Stuarts Draft, VA (US)

(*) Notice: Subject to any disclaimer, the term of this patent is extended or adjusted under 35 U.S.C. 154(b) by 822 days.

(21) Appl. No.: 14/461,112

(22) Filed: Aug. 15, 2014

Related U.S. Application Data (60) Provisional application No. 61/866,445, filed on Aug. 15, 2013.

(51) Int. Cl.
*A01K 13/00* (2006.01)
*A61D 9/00* (2006.01)

(52) U.S. Cl.
CPC ............ *A61D 9/00* (2013.01); *A01K 13/006* (2013.01)

(58) Field of Classification Search
CPC ................................ A61D 9/00; A01K 13/006
USPC .............. 119/850, 856, 907; 602/19, 75, 76
See application file for complete search history.

(56) References Cited

U.S. PATENT DOCUMENTS

| | | | | |
|---|---|---|---|---|
| 4,385,592 A * | 5/1983 | Goldstein | ............. | A01K 15/04 119/815 |
| 4,414,970 A * | 11/1983 | Berry | ................ | A61F 13/00038 602/75 |
| 4,489,676 A * | 12/1984 | Colquist | .................. | A61D 9/00 119/815 |
| 4,996,949 A * | 3/1991 | Wunderman | .......... | A01K 23/00 119/850 |
| 5,137,508 A * | 8/1992 | Engman | .................... | A61D 9/00 119/850 |
| 5,146,874 A * | 9/1992 | Vidal | ...................... | A01K 23/00 119/868 |
| 5,432,951 A * | 7/1995 | Yewer, Jr. | ................ | A61F 5/028 139/384 R |
| 5,447,498 A * | 9/1995 | Watson | .................... | A61F 5/028 128/99.1 |
| 5,458,094 A * | 10/1995 | Proshan | ............... | A01K 13/006 119/850 |
| 5,996,537 A * | 12/1999 | Caditz | .................. | A01K 13/008 119/850 |
| 6,058,890 A * | 5/2000 | Harrell | ................. | A01K 13/006 119/850 |
| 6,138,611 A * | 10/2000 | Thielemann | ......... | A01K 13/006 119/850 |
| 6,309,369 B1 * | 10/2001 | Lebovic | ................ | A61F 13/145 602/19 |
| 6,478,759 B1 * | 11/2002 | Modglin | ................. | A61F 5/028 128/100.1 |
| 6,557,497 B1 * | 5/2003 | Milligan | ................ | A01K 23/00 119/850 |
| 7,004,922 B1 * | 2/2006 | Shesol | ..................... | A61D 9/00 119/856 |
| 8,007,457 B2 * | 8/2011 | Taylor | ................... | A61F 5/0102 2/69 |

(Continued)

*Primary Examiner* — David J Parsley
*Assistant Examiner* — Danielle A Clerkley
(74) *Attorney, Agent, or Firm* — Kimberly O Snead (57) ABSTRACT

The disclosed protective covering protects a wound or surgical area against the animal licking, chewing and clawing or scratching the area. The vented flexible design allows for easy movement and air flow to the wound which is vital for wound to heal quickly. The material of manufacture is such that the wrap does not slide or move on the animal's body is washable, and preferably sterilizable, and permits air flow.

18 Claims, 9 Drawing Sheets

(56) References Cited

U.S. PATENT DOCUMENTS

| | | | |
|---|---|---|---|
| 8,439,000 B1* | 5/2013 | Mehtupciu-Ionescu | A01K 23/00 119/850 |
| 8,733,296 B1* | 5/2014 | Douglas | A01K 13/006 119/850 |
| 8,808,213 B2* | 8/2014 | Hendricks | A61F 5/028 602/19 |
| 9,072,278 B2* | 7/2015 | Chortyk-White | A01K 13/006 |
| 2008/0021363 A1* | 1/2008 | Fee | A41D 13/0562 602/76 |
| 2010/0043724 A1* | 2/2010 | Sherer | A01K 13/006 119/850 |
| 2010/0319632 A1* | 12/2010 | Blizzard | A01K 13/006 119/850 |
| 2015/0034021 A1* | 2/2015 | Vogt | A61D 9/00 119/850 |
| 2015/0320014 A1* | 11/2015 | Anthony | A01K 13/006 119/850 |

\* cited by examiner

PROTECTIVE WRAP

FIELD OF THE INVENTION

The invention relates to a flexible, breathable protective wrap for animals to protect wounds and surgical areas.

BACKGROUND OF THE INVENTION

Several restraints have been developed to prevent animals from accessing a wound or incision. U.S. Pat. No. 8,286,593 discloses a restraint in the form of a collar that is capable of closely conforming to the skeletal structure of the animal at a number of different locations in order to limit physical movement of the head of the animal. The restraint collar includes a body having an upper member adapted to be situated below a jaw of the animal in a region of an upper portion of the animal's neck, and a lower member adapted to be situated in a region of a lower portion of the animal's neck. The body upper member includes a jaw guide located between two upper member crests and having a portion extending downwardly and below the crest towards the lower member. It is adapted to be situated at a central area of the animal's neck. The crests are adapted to fit below the sides of the animal's jaw to provide for a desired restraint. U.S. Pat. No. 7,878,155 also relates to a collar device that limits the head movement for a canine or feline pet while the pet is recuperating from surgery or injury. The collar may be fitted with removable ear guards. The collar is capable of being coupled to a leash so the animal can be taken on a walk with the protective collar in an operative position.

U.S. Pat. No. 5,197,414, 5,307,764 discloses an animal protective collar made of an open work or reticulated material whereby water cannot pool inside the collar when the collar is formed into a truncated cone or funnel and fitted on the neck of an animal such as a dog or cat. Preferably the reticulated material is held in the cone shape via complementary male and female hook fasteners positioned concentrically for selectively sizing the collar. The protective collar, which can be stainless steel or synthetic resin, is useful for protecting a groomer from being bitten during shampooing and the like, and alternatively can prevent the animal from licking a wound on its body or scratching a wound on its head, but providing good ventilation. The body of the collar preferably is formed of a net material with peripheral and radial reinforcement ribs. A grip is attached to project from the outer peripheral rim of the collar, enabling gentle but secure manual control of the animal during shower operations and the like.

DETAILED DESCRIPTION OF THE INVENTION

Definitions

As used herein the term "wound", "injury", "surface abrasion" and "incision site" shall be used interchangeably and refer to any incident on the body of an animal that is cut, scraped, over heated (hot spot) or any other abnormal skin or tissue area.

As used herein the term "support ribs" or "ribs" shall refer to any semi-ridge material, or area of thickness of material, that will provide support to the wrap along the stomach of the animal and whose length is parallel to the ends of the wrap. The ribs can be adhered to the wrap in any manner applicable.

As used herein the term "protective covering", "protective wrap", "covering" or "wrap" shall be used interchangeably and shall refer to the disclosed wrap that covers a portion of the animal's body.

The disclosed protective covering overcomes the problems associated with the prior art to protect a wound or incision site against the animal licking, chewing and clawing or scratching the area. The vented flexible design allows for easy movement and air flow to the wound which is vital for a wound to heal quickly. An animal's torso (especially a dogs) is very hard to bandage without tape which limits inspection of the wound and medication application without bandage removal and reapplication. It is also very painful for the animal removing tape. The only other option is the Elizabethan Collar. This is great for guarding against licking, as it isolates the animals head but the animal can still scratch. The large collars provide to be quite nerve racking for both the animal and the owner. The disclosed bandage provides freedom and security while enabling wound care and increased healing time.

Although the protective covering is illustrated herein on a dog, it should be noted that the covering can be sized for most animals and the alterations to the dimensions and mesh weight, when following the disclosed criteria, will be obvious to those skilled in the art.

A critical feature of the protective wraps disclosed herein is the material of manufacture. Since the purpose of the disclosed wrap is to prevent access to a wound or surgical site, whether covered with a bandage or exposed to the air, the wrap must not slide or move on the animal's body. Further, the protective wrap needs to be washable and preferably able to be sterilized. A third requirement for the warp is to enable air flow; therefore, the material of manufacture must be an open mesh. The holes within the mesh cannot be so large as to catch the claws, or feet, of an animal, while still enabling sufficient air flow. A plastic mesh material is an example of the basic construction of the protective wrap as it provides air circulation, sterilization and the ability to secure the wrap around an animal. The holes in the mesh, or craft canvas, are stamped out at time of manufacture, thereby providing an easy method to provide multiple hole sizes. The weight of the material must provide flexibility and strength and a general ratio of each hole, or vent, having an adjacent solid area equal to the width of the hole. For example, a ⅛ inch hole would have ⅛ inch of solid material on all sides between holes.

Figure 1:
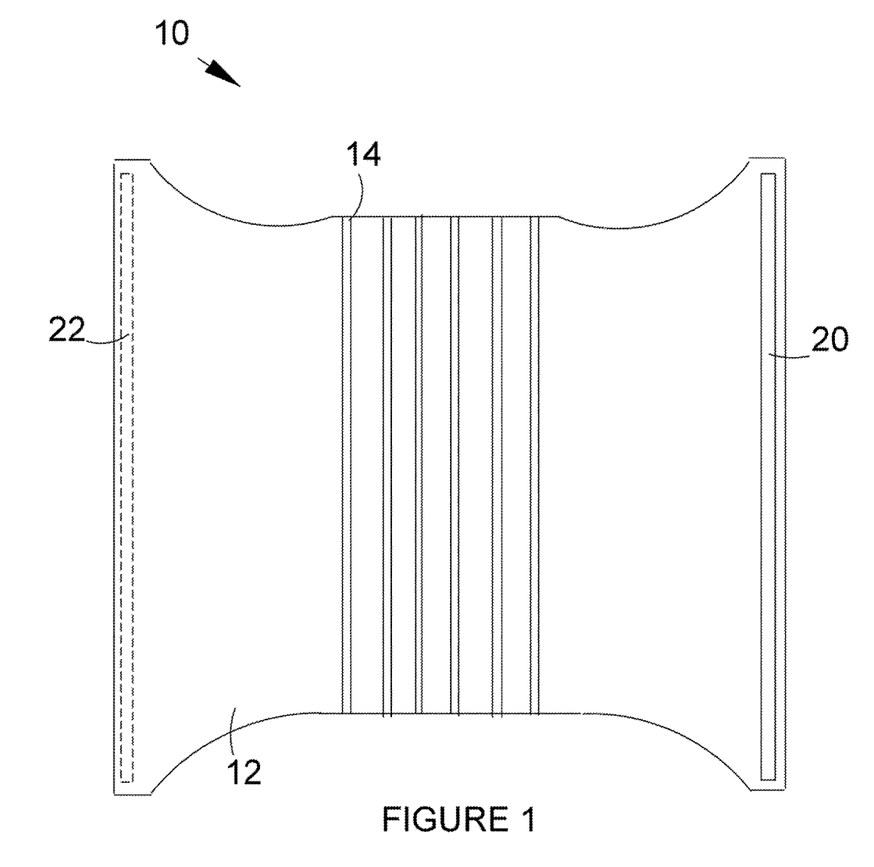
FIG. 1 is a plan view of the protective wrap in accordance with the present invention.

The disclosed protective covering 10, as illustrated in FIG. 1, is designed to cover the torso of the animal. The body 12 is configured to fit between front and rear legs of the animal, wrapping around the torso to be secured at the spine. As seen in this embodiment, hook 20 and loop 22 material such as Velcro®, or the equivalent, is used as the securing members to secure the protective covering 10. Preferably the body 12 is configured to get wider once the legs are cleared as this enables the animal to maintain freedom of movement. Although the transition from the belly area containing the ribs 14 to the securing member 20 and 22 are illustrated as arcs around the leg area, the transition can also be squared, although arcs around the leg areas provide more comfort for the animal. it is possible for the body 12 to maintain the same width, having an increased area for securing the wrap 10 is preferable, especially in larger animals. The increased length along the spine further prevents slippage.

In this embodiment support ribs 14 provide additional support to the protective covering 10. The number and length of the support ribs 14 will vary depending on the size of the protective covering 10. For example, a protective covering 10 for a small dog can only have one or two support ribs 14 that extend across or partially from edge to edge, or the ribs can be eliminated altogether. When use for on a large dog, the number of ribs 14 will be increased and extend from edge to edge. The number of ribs and dimensioning will be obvious to those skilled in the art. The ribs 14 can be additional layers of a separate material, such as boning used in clothing, fused to the material of the body 12 or thicker layers of the same material. The thickness of the ribs 14 will determine the rigidity of the protective wrap 10. The decision regarding whether to add material, thicken the material existing material, or simply not stamp holes in that area will be dependent on the stiffness desired and the size of the animal. For dogs the additional thickness would be double or triple the thickness of the body 12. For example a material that is ¹⁄₁₆ of an inch thick would have ribs that are about ⅛ or ³⁄₁₆ inch thick.

The embodiment illustrated in FIG. 1 uses two part securing members 20 and 22, which in this illustration are hook and loop to secure the protective covering 10 at the animal's spine. Examples of other two part securing members would be snaps, metal hooks, buttons, side locks, hook and eye, buckles, or ties. In another illustrated embodiment hooks are provide on one side of the wrap and hooked directly into the vents on the opposing side.

Figure 2:
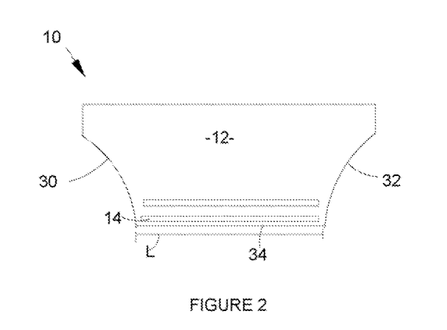
FIG. 2 is a side view of the protective wrap folded as it would be in use in accordance with the present invention.
Figure 3:
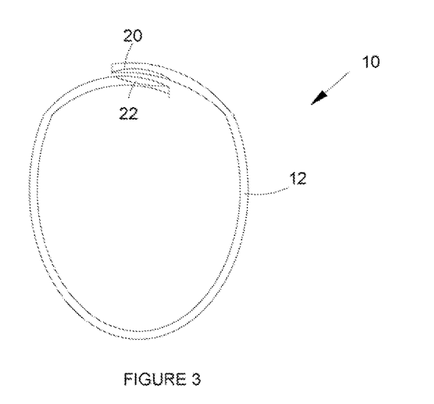
FIG. 3 is a front view of the protective wrap of FIGS. 1 and 2 in accordance with the present invention.

FIG. 2 illustrates the protective covering 10 closed and viewed from the side. As can be seen, the front edge 30 and rear edge 32 are curved to fit around the animal's front and hind legs. The curves permit the animal to move freely and comfortably. Although the body 12 could extend straight up from the bottom edge 34, depending on end use, it could potentially compromise the strength of the securing members. The length L of the bottom edge 34 must be less than the body of the animal to enable freedom of movement and the selection of size will be obvious to the user. In FIG. 3 the protective covering 10 is illustrated from a closed end view.

Figure 4:
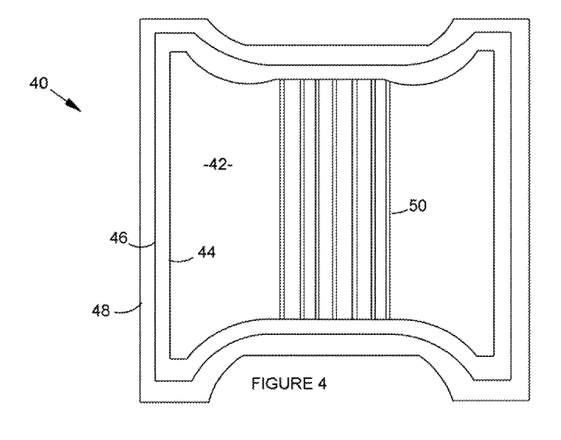
FIG. 4 is a plan view of an alternate embodiment of the invention in accordance with the present invention.

In an alternative embodiment illustrated in FIG. 4, the protective covering 40 has a body 42 that is marked for multiple sizes. The user would cut along the additional periphery lines for inner periphery 44, mid periphery 46 or outer periphery 48 to obtain the best fit for the animal. In this embodiment the ribs 50 only extend to the edge of the inner periphery 44. As discussed heretofore, one critical feature of the protective coverings disclosed herein is the material of manufacture. The vents in the material must not be so great as to permit the claws, if applicable, of the animal to get caught. Therefore, the size differential between the inner periphery 44, mid periphery 46 and outer periphery 48 must not be so great as to change vent sizes.

As noted, the preferred material of manufacture is a plastic mesh and therefore, if simply cut along the periphery lines, would leave raw edges having points. To prevent this, the inner periphery 44, mid periphery 46 or outer periphery 48 of FIG. 4 and inner periphery 62, mid periphery 64 and outer periphery 66 of FIG. 5 should all be solid. This can be accomplished, as with the ribs, by either fusing extra layers of material at the periphery or setting the die so that holes are not punched in the desired areas. This will be dependent upon the method of manufacture and will be known by those skilled in the art.

Figure 5:
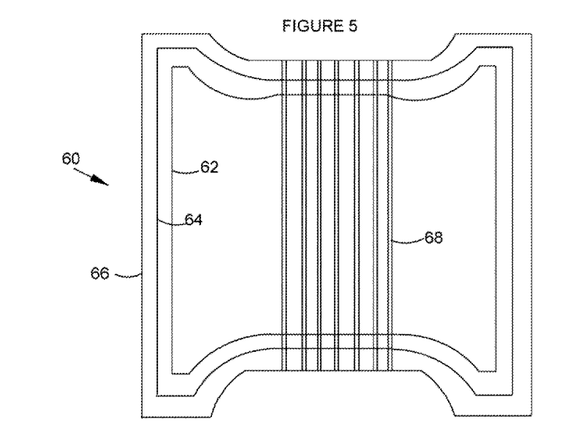
FIG. 5 is a plan view of an additional embodiment of the invention in accordance with the present invention.

In FIG. 5 the protective covering 60 also has the inner periphery 62, mid periphery 64 and outer periphery 66, however in this embodiment the ribs 68 extend to the outer periphery 66. In this embodiment, the ribs 68 must be manufactured from a material that is easily cut by the user. Alternatively, it can be thinner at the cut points of the inner periphery 62 and mid periphery 64 can be thinner than the remaining portions of the ribs 68.

Figure 6:
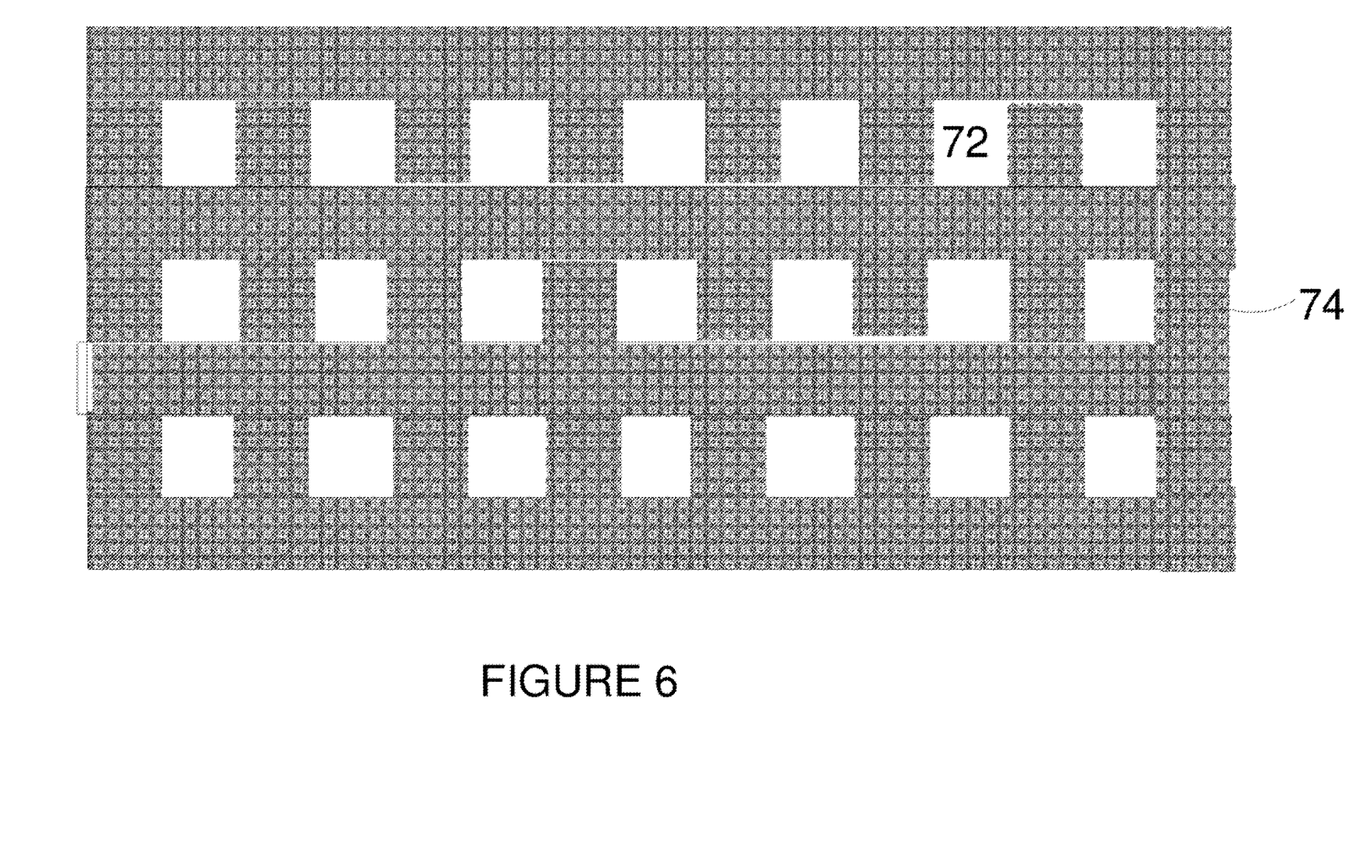
FIG. 6 is a plan view of example material of manufacture in accordance with the present invention.

As noted heretofore, in order to allow for the wound or surgical area to receive air, the protective covering disclosed herein must have vents, or holes. Illustrated in FIG. 6 is an example pattern that can be used and is similar to material referred to as craft canvas or plastic mesh. The dimensions of the vents 72 will vary depending upon the size of the animal in order to avoid nails or claws from getting tangled or caught within the vents 72. As the vents 72 are to promote faster healing, the size must be sufficient to permit air to pass through. Further, to withstand scratching, chewing and movement, the solid portions 74 must have a rigidity sufficient to prevent bunching or tearing.

The dimensions of the vents 72 and rigidity of the warp and fill solid portions 74 will vary depending upon the type and size of the animal. For example the bandage for a small dog, such as a toy Poodle or Jack Russell, would be thinner, so the animal could move and lay down freely, than for a large dog. For the smaller dogs the thickness of the material used is about 0.4 mm (0.016 in) with the about 1.67 mm (0.066 in) vents, or holes 72 placed approximate every 1.62 mm (0.064 in) within the solid portions 74. For a mid-sized animal, such as a Beagle or Whippet, the thickness is increased to about 3 mm (⅛") thick with 3 mm (⅛") vents 72 placed every 3 mm (⅛"). For a large dog, such as a Labrador or German Shepherd, the solid portions 74 are 5 mm (¹³⁄₆₄)" thick with 5 mm (¹³⁄₆₄)" vents 72 placed every 5 mm (13/64 in). The afore noted dimensions can vary by 20%. The size of the bandage would increase, or decrease, in thickness and ventilation hole size with the size of the animal. As the plastic must be rigid enough to prevent tearing, it must also be flexible enough to allow ease of movement by the animal. For small dogs, the thickness of the material can be as low as 0.028 mm.

Figure 7:
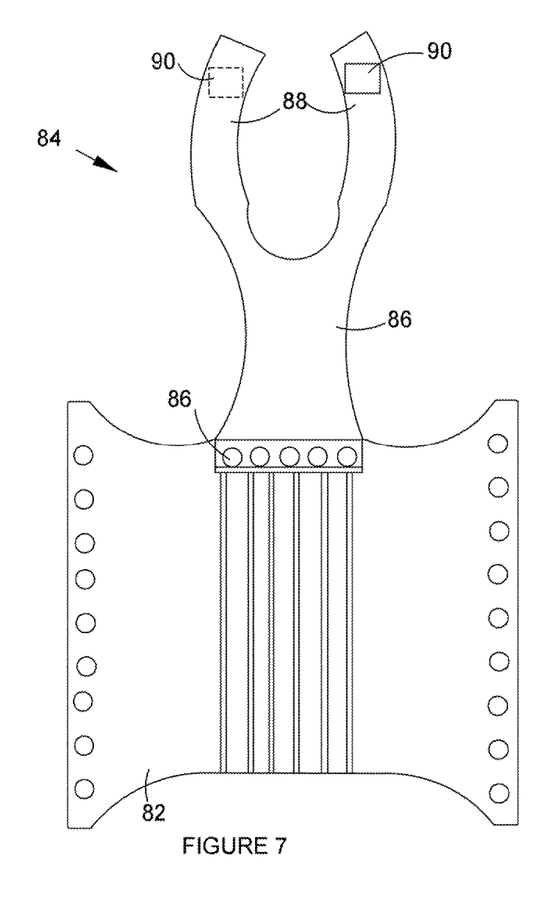
FIG. 7 is a plan view of an alternate embodiment of the protective covering with a removable chest protection unit having a narrow neck attachment.

In FIG. 7 a Y shaped chest protector 84, having a base and two legs, has been added to the protective wrap 82. In this embodiment the chest protector 84 is attached via snaps 86, or other securing members as noted above. Alternatively the chest protector 84 can be permanently attached to the protective wrap 82. The chest cover 86 splits into two neck attachment sections 88 that are placed around the neck of the animal and secured with hook and loop 90, or other securing members. In this embodiment the neck attachment sections 88 are narrow and would provide little or no protection to the neck itself. The neck attachment sections can, however, be made wider to provide coverage of the neck area.

The chest protector 84 extends from the front edge of the protective wrap 82 and will, when secured, protect any chest wounds or surgeries in the same manner as the protective wrap 82. The dimensions will vary depending upon the size of the animal and will be accounted for in the sizing discussed heretofore.

Figure 11:
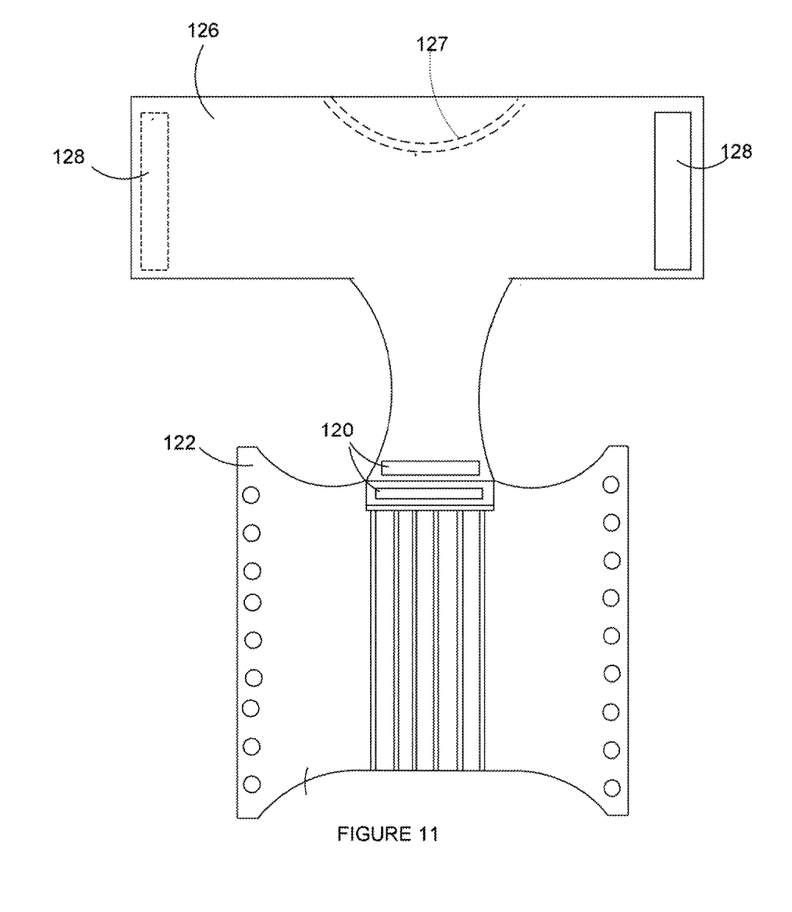
FIG. 11 is an alternate embodiment of the protective wrap of FIG. 7 having a wide neck protection area in accordance with the present invention.

In the embodiment illustrated in FIG. 11, additional sizing adjustment is obtained through the use of hook 120 and loop (not shown) material. At least one strip of loop material would be placed on the protective wrap 122 to receive the hook strip 120. Although only two hook strips 120 are illustrated, additional strips can be used. This will enable the user to customize the length of the chest protector 124. Although other fastening members can be used, a hook and loop material is the easiest and most economical but can be substituted by fastening members that will be known to those skilled in the art. Additionally, although loop material is referred to as being attached to the chest protector 122, this is not necessary and the positioning can be reversed. Also in this embodiment, additional closure members 128 can be added to the neck attachment sections 126 to enable further adjustability. In FIG. 11 the neck protector 126 has been increased in size to provide increased protection for the neck area. The neck protector 126 can be provided with a cutout line 127 for comfort in the event the neck protector is too wide and requires cutting by the user. Alternatively the cutout can be done at time of manufacture. As with all edges and cutouts, the edges need to be protected as described heretofore.

Figure 8:
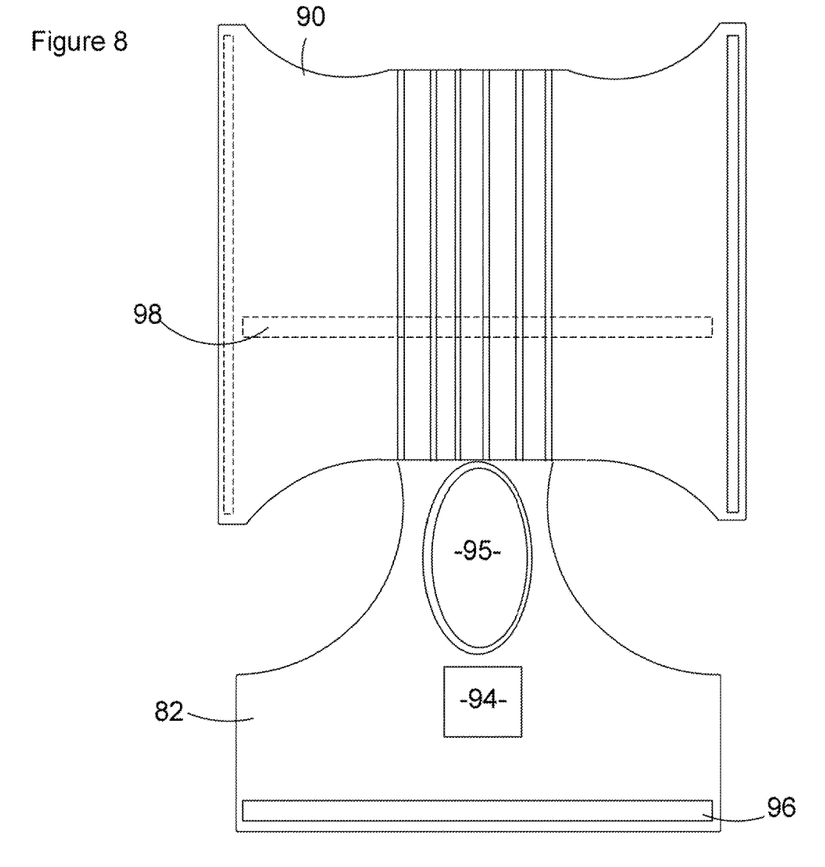
FIG. 8 is a plan view is a plan view of another embodiment of the invention in accordance with the present invention.

In FIG. 8 the protective wrap 90 has a rear panel 92 affixed thereto. The rear panel 82 can be used to protect a wound or surgical area on an animal's haunches or back area or be modified to hold a pad for a female in heat. In this embodiment the rear panel 92 is integral with the protective wrap 90, however it can be removable as disclosed heretofore. The removable rear panel 92 would be required when being used with a female in heat. The protective wrap 90 is secured around the animal, the tail placed through the opening 94 and the hook strip 96 secured to the loop strip 98. As with other embodiments disclosed, other fastening members can be substituted for hook and loop.

For male dogs either opening 94 can be extended, depending on the surgical location, or an additional optional cut out area 95, to accommodate the genital area. From a manufacturing standpoint, this can be accomplished by extending the opening or having a closed extension that can be cut out. Again, this would require that the edges be sealed as noted heretofore.

Figure 9:
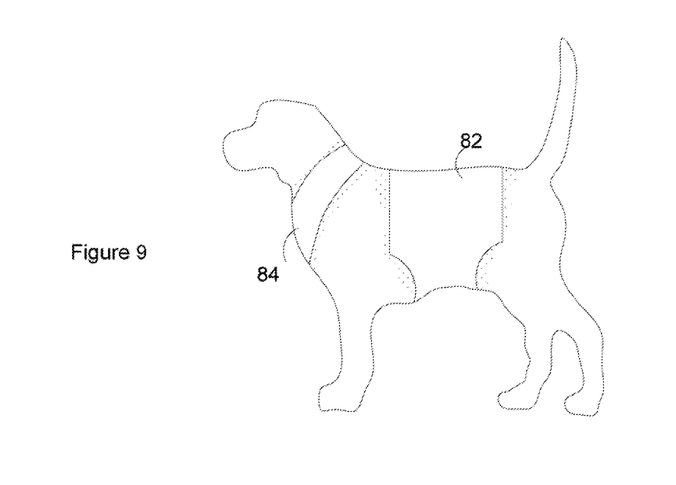
FIG. 9 is the embodiment of the protective wrap of FIG. 7 on a dog in accordance with the present invention.
Figure 10:
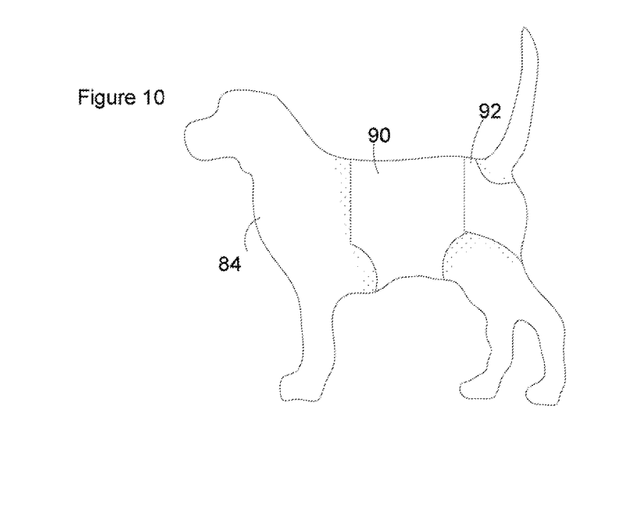
FIG. 10 is the embodiment of the protective wrap of FIG. 8 a dog in accordance with the present invention.

FIG. 9 illustrates a side view of a dog wearing the disclosed protective wrap 82 with the chest protector 84 and FIG. 10 shows a dog wearing the protective wrap 90 with the rear protector 92.

The fit of the protective wraps illustrated herein preferably fit as illustrated in FIGS. 9 and 10, whether or not they have the additional elements. It is important to the fit that the animal's legs can move comfortably and that they are able to lie down in a normal sleeping position.

Figure 12A:
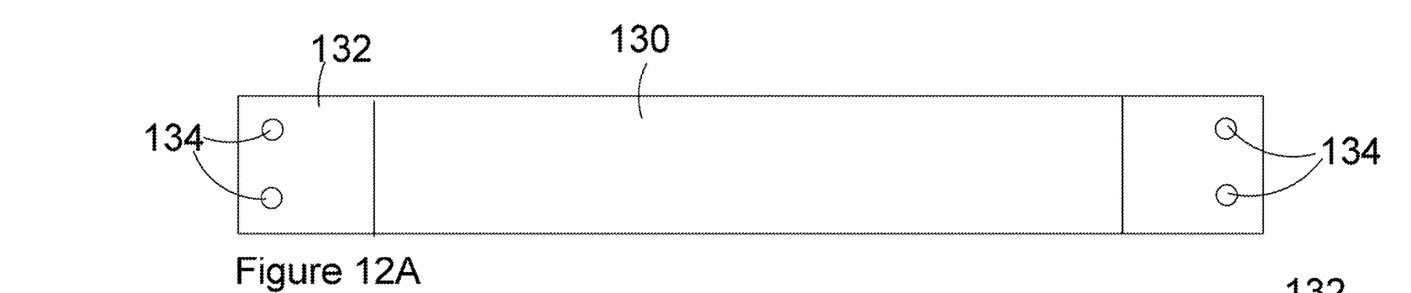
FIG. 12a is a top plan view of an elastic connector in accordance with the invention.
Figure 12B:
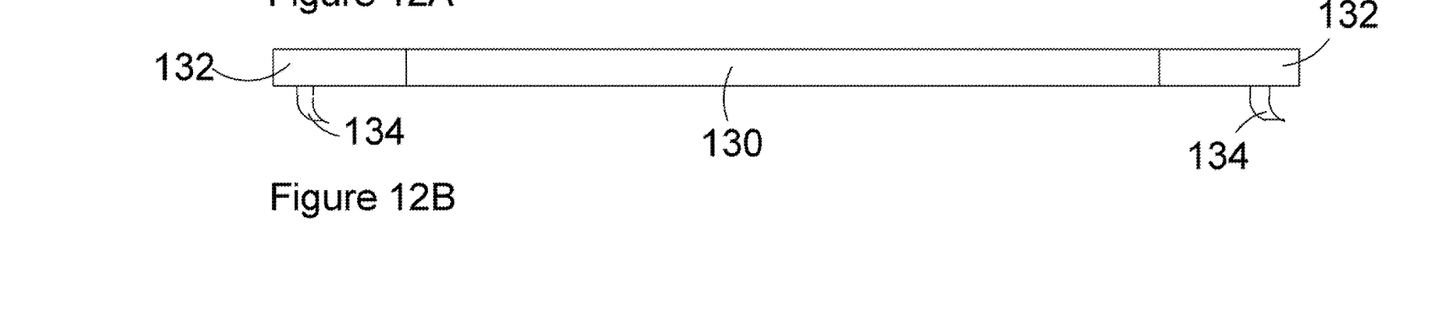
FIG. 12b is a side view of the connector of FIG. 12A.

In FIGS. 12A and 12B an alternate method of securing the protective wraps disclosed herein using elastic 130. The ends of the elastic 130 are provided with rigid end caps 132 having hooks 134. The hooks 134 are dimensioned to hook into the holes in the protective wrap to secure the wrap around the animal's body. The caps 132 are generally manufactured of metal, however other materials that will provide the strength and rigidity can be used. The metal provides an advantage that the caps 132 can be secured to the elastic 130 by crimping. The ends of the hooks 134 are rounded to avoid injury to the user or animal.

The disclosed protective wrap is discussed using a material having vents for wound viewing and air flow. It should be noted that the materials can change dependent upon end use and Kevlar or other ballistic material can be used to provide body armor for either law enforcement or sports use.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language of the present invention or inventions should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

While in the foregoing we have disclosed embodiments of the invention in considerable detail, it will understood by those skilled in the art that many of these details may be varied without departing from the spirit and scope of the invention.

What is claimed is:

1. A protective wrap to protect surface abrasion on an animal, said wrap being a flexible, plastic mesh material having a warp and fill forming multiple vents and having:

a. an outer peripheral region, said outer peripheral region having:
   i. a distal edge;
   ii. a proximal edge;
   iii. a first end, said first end having a first distance extending between, and in contact with, said distal edge and said proximal edge and having a first securing member;
   iv. a second end, said second end having a second distance equal to said first distance and extending between, and in contact with, said distal edge and said proximal edge and having a second securing member, said second securing member interacting with said first securing member to maintain said first end and second end adjacent one another;
b. a center region, said center region having a third distance extending between said distal edge and said proximal edge, said third distance being less than said first distance and said second distance;
c. four arcuate connection regions, a first of said four arcuate connection regions positioned between, and adjacent to, said first end and said center region at said distal edge, a second of said four arcuate connection regions positioned between, and adjacent to, said first end and said center region at said proximal edge, a third of said four arcuate connection regions positioned between, and adjacent to, said second end and said center region at said distal edge, and a fourth of said four arcuate connection regions positioned between, and adjacent to, said second end and said center region at said proximal edge.

2. The protective wrap of claim 1 further comprising an edging, said edging extending along said peripheral region.

3. The protective wrap of claim 1 further comprising at least one rib, each of said at least one rib extending from said proximal edge to said distal edge within said center region.

4. The protective wrap of wherein each of said at least one rib has a thickness of between two and three times the thickness of said material.

5. The protective wrap of claim 1 further wherein said first securing member and said second securing member are hook and loop.

6. The protective wrap of claim 1 wherein said first securing member is at least one hook and said second securing member is said vents, each of said at least one hook being dimensioned to fit within said vents and being curved to catch within said vents on either said warp or said fill to secure said proximal edge to said distal edge.

7. The protective wrap of claim 1 wherein said first securing member is at least one hook and said second securing member is at least one hook, each of said first securing member and said second securing member being affixed to opposing sides of elastic and dimensioned to catch on either said warp or said fill to secure said proximal edge to said distal edge.

8. The protective wrap of claim 1 wherein said vents are in the range of 1.67 mm to about 5 mm.

9. The protective wrap of claim 1 wherein material thickness is from about 0.4 mm to about 5 mm.

10. The protective wrap of claim 1 wherein said warp and fill have a width of 1.62 to about 5 mm.

11. The protective wrap of claim 1 having at least one additional periphery, each of said additional periphery being equally spaced from said outer peripheral region and an adjacent periphery thereby enabling said wrap to be cut at said at least one additional periphery to decrease said wrap in size.

12. The protective wrap of claim 11 further comprising at least one rib in said central region, said at least one rib extending at least to a first of said at least one additional periphery.

13. The protective wrap of claim 11, wherein each of said at least one additional periphery is without vents to prevent sharp edges when cut.

14. The protective wrap of claim 1 further comprising a chest protector, said chest protector having a base and two legs, said base being adjacent to said proximal edge of said center region and each of said two legs having cooperating securing members, wherein said base extends between the front legs of said animal and said two leas affix to one another at the top of the neck of said animal.

15. The protective wrap of claim 14, wherein said base of said chest protector is removable from center region.

16. The protective wrap of claim 14, wherein said base of said chest protector is integral with said center region.

17. The protective wrap of claim 1 further comprising a rear panel, said rear panel having:
   a base, said base being affixed to said distal edge of said central region and dimension to fit between the back legs of said animal,
   a pair of legs, said pair of legs being dimensioned to affix to the top surface of said wrap,
   multiple cut out regions, at least one of said multiple cut out regions dimensioned to receive an animal's tail and another of said multiple cut out regions dimensions to receive a dog's genital area.

18. The protective wrap of claim 1 wherein each of said vents has a diameter and said warp and said fill each have a diameter equal to said diameter of said vents.

* * * * *